No. 759,638. PATENTED MAY 10, 1904.
G. M. DE SAINT LÉGER.
SPRING WHEEL.
APPLICATION FILED AUG. 18, 1903.
NO MODEL.
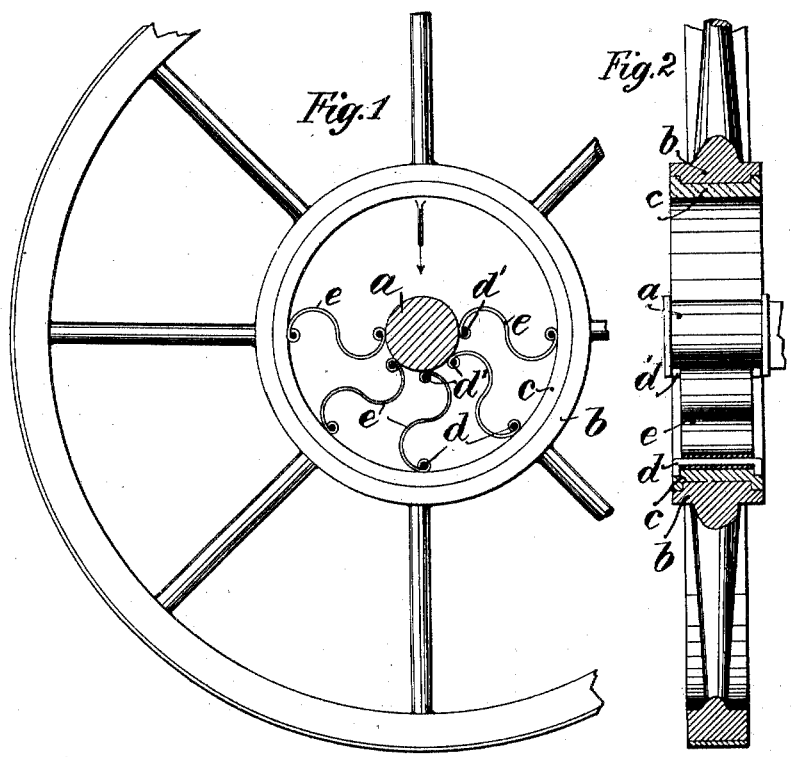

No. 759,638. Patented May 10, 1904.

UNITED STATES PATENT OFFICE.

GUSTAVE MAXIMILIAN DE SAINT LÉGER, OF LONDON, ENGLAND.

SPRING-WHEEL.

SPECIFICATION forming part of Letters Patent No. 759,638, dated May 10, 1904.

Application filed August 18, 1903. Serial No. 169,878. (No model.)

*To all whom it may concern:*

Be it known that I, GUSTAVE MAXIMILIAN DE SAINT LÉGER, merchant, a citizen of the Republic of France, residing at 17 Maxilla Gardens, North Kensington, London W., England, have invented certain new and useful Improvements in Spring-Wheels, of which the following is a specification.

My invention relates to certain improvements in spring-wheels for motor-cars, carriages, cycles, or any other vehicles in use for light or heavy transports or purposes and comprises a spring-wheel which has arranged within an annular space between the suitably-enlarged nave and the axle-journal a series of springs for the purpose of supporting the weight of the carriage and to soften the shocks thereof.

For better illustrating my invention I have represented the same in the accompanying sheet of drawings, in which—

Figures 1 and 2 show a spring-wheel with my improvements in an elevational and cross-sectional view.

Referring to Figs. 1 and 2, $a$ is the rigidly-mounted axle-journal, which is surrounded by an externally-grooved ring $c$, forming the bearing for the suitably-enlarged nave $b$, which latter fits snugly into the annular groove of the said ring $c$. Pivots $d$ and $d'$ are provided in a radial line oppositely to each other on the inner circumference of ring $c$ and on the axle $a$, respectively, for pivoting thereto S-shaped flat springs, which are adapted to support the vertically-loaded axle (see the arrow in Fig. 1) from below and on both sides thereof and to receive and soften the shocks thereon.

Having now particularly described my invention, I claim—

In a spring-wheel, the combination of a rigidly-mounted axle-journal, an externally-grooved ring concentrically surrounding said axle-journal, springs connecting said axle-journal and ring so as to support said journal, a nave-ring fitting into the said grooved ring turnable thereon, a felly concentrically surrounding said nave-ring and spokes between said nave-ring and felly, substantially as described.

GUSTAVE MAXIMILIAN DE SAINT LÉGER.

Witnesses:
FREDK. L. RAND,
ALFRED NUTTING.